US012761527B2

(12) United States Patent
Tseng et al.

(10) Patent No.: US 12,761,527 B2
(45) Date of Patent: Oct. 13, 2026

(54) METHOD FOR PREPARING APERTURE, APERTURE, CAMERA MODULE, AND ELECTRONIC DEVICE

(71) Applicant: Luxshare Intelligent Manufacture Technology (Changshu) Co., Ltd, Changshu City (CN)

(72) Inventors: Poying Tseng, Changshu City (CN); Mhsuan Cheng, Changshu City (CN)

(73) Assignee: LUXSHARE INTELLIGENT MANUFACTURE TECHNOLOGY (CHANGSHU) CO., LTD, Changshu City (CN)

( * ) Notice: Subject to any disclaimer, the term of this patent is extended or adjusted under 35 U.S.C. 154(b) by 121 days.

(21) Appl. No.: 19/025,696

(22) Filed: Jan. 16, 2025

(65) Prior Publication Data

US 2026/0133468 A1 May 14, 2026

(30) Foreign Application Priority Data

Nov. 12, 2024 (CN) ........................ 202411612172.4

(51) Int. Cl.
*H04N 5/335* (2011.01)
*G03B 9/06* (2021.01)

(52) U.S. Cl.
CPC .................................... *G03B 9/06* (2013.01)

(58) Field of Classification Search
CPC ....................................................... G03B 9/06
See application file for complete search history.

(56) References Cited

U.S. PATENT DOCUMENTS 5,997,187 A * 12/1999 Hamasaki ................ G03B 9/24 396/458
7,042,457 B2 * 5/2006 Rosel ...................... G06T 11/23 345/442
11,796,892 B2 * 10/2023 Ku ......................... G02B 5/005
2026/0133469 A1 * 5/2026 Chen ....................... G03B 9/06

FOREIGN PATENT DOCUMENTS

CN 103376614 B 6/2017

* cited by examiner

*Primary Examiner* — Gary C Vieaux
(74) *Attorney, Agent, or Firm* — Birch, Stewart, Kolasch & Birch, LLP

(57) ABSTRACT

Provided are a method for preparing an aperture, an aperture, a camera module, and an electronic device. The method includes acquiring an aperture stop of the aperture, a rotor motion parameter of the aperture, a guide post position of the aperture, and a blade parameter of the aperture; determining a guide groove path based on at least one of the aperture stop, the rotor motion parameter, the guide post position, or the blade parameter; acquiring the preset tilt angle specification; in the case where a path inclination angle between the guide groove path and the guide post position does not meet the preset tilt angle specification, segmenting the guide groove path to establish at least two sub-arc segments, and applying a G3 continuity design between two adjacent sub-arc segments.

20 Claims, 7 Drawing Sheets

METHOD FOR PREPARING APERTURE, APERTURE, CAMERA MODULE, AND ELECTRONIC DEVICE

CROSS-REFERENCE TO RELATED APPLICATION(S)

This application claims priority to Chinese Patent Application No. 202411612172.4 filed with the China National Intellectual Property Administration (CNIPA) on Nov. 12, 2024, the disclosure of which is incorporated herein by reference in its entirety.

TECHNICAL FIELD

The present invention relates to the technical field of optical devices, in particular, a method for preparing an aperture, an aperture, a camera module, and an electronic device.

BACKGROUND

An aperture is a component in a camera used to adjust the size of the lens aperture to control imaging parameters such as depth of field and light intake. Typically, an aperture employs multiple blades combined with guide posts and guide grooves. The blades are driven to move along the paths defined by the guide grooves to achieve the control of aperture opening and closing.

In the existing art, an aperture guide groove is often composed of multiple curve segments, and the curves are usually connected by tangential continuity, that is, G1 continuity. FIG. 1 is a diagram illustrating the structure of an existing aperture guide groove. As shown in FIG. 1, in curves connected using G1 continuity, the curvature and radii of curvature of the curves are not continuous. This can result in oscillations in thrust torque caused by discontinuous acceleration forces and blade rotation stuttering during the motion of the guide post and guide groove, adversely affecting the design performance of the guide groove.

SUMMARY

The present invention provides a method for preparing an aperture, an aperture, a camera module, and an electronic device to address the problem of oscillations in thrust torque and blade rotation stuttering caused by the discontinuity in curvature and radius of curvature in the existing aperture guide groove, thereby enhancing the dynamic performance of the aperture guide groove.

According to an aspect of the present invention, a method for preparing an aperture is provided. The aperture includes a housing, a rotor disposed in the housing, and multiple blades annularly distributed on the rotor, and a guide post is disposed on the rotor. The method includes acquiring an aperture stop of the aperture, a rotor motion parameter of the aperture, a guide post position of the aperture, and a blade parameter of the aperture; determining a guide groove path based on at least one of the aperture stop, the rotor motion parameter, the guide post position, or the blade parameter; acquiring the preset tilt angle specification; in the case where a path inclination angle between the guide groove path and the guide post position does not meet the preset tilt angle specification, segmenting the guide groove path to establish at least two sub-arc segments, and applying a G3 continuity design between two adjacent sub-arc segments.

Optionally, in the case where the path inclination angle between the guide groove path and the guide post position does not meet the preset tilt angle specification, segmenting the guide groove path to establish the at least two sub-arc segments and applying the G3 continuity design between the two adjacent sub-arc segments includes acquiring the curvature change rate of the guide groove path across different aperture stops and a correlation between the aperture stop and the curvature change rate; setting a segmentation point on any path between aperture stops with a relatively higher curvature change rate or on any path between aperture stops with a relatively lower correlation; and determining the G3 curvature based on arc curvatures on two sides of the segmentation point.

Optionally, in the case where the path inclination angle between the guide groove path and the guide post position does not meet the preset tilt angle specification, segmenting the guide groove path to establish the at least two sub-arc segments and applying the G3 continuity design between the two adjacent sub-arc segments also includes segmenting the guide groove path based on a preset step size, and calculating sub-path inclination angles between different sub-path segments and the guide post position; in the case where a sub-path inclination angle does not meet the preset tilt angle specification, setting a segmentation point on the sub-path segment corresponding to the sub-path inclination angle; and determining a G3 curvature based on arc curvatures on two sides of the segmentation point.

Optionally, determining the guide groove path based on at least one of the aperture stop, the rotor motion parameter, the guide post position, or the blade parameter includes acquiring the maximum stop of the aperture stop, the intermediate stop of the aperture stop, and the minimum stop of the aperture stop; and determining the guide groove path based on the aperture diameter corresponding to the maximum stop, the aperture diameter corresponding to the intermediate stop, and the aperture diameter corresponding to the minimum stop.

Optionally, acquiring the aperture stop, the rotor motion parameter, the guide post position, and the blade parameter of the aperture includes determining the aperture stop and the aperture diameter corresponding to the aperture stop based on demand data of a camera module; and/or determining the guide post position based on the aperture diameter and the constraint dimension of the housing; and/or determining the rotor motion parameter based on aperture rotation thrust, the aperture diameter, and an inner arc of a blade.

Optionally, acquiring the preset tilt angle specification includes acquiring a resistance parameter of a blade rotating along the guide groove path; and determining the preset tilt angle specification based on the resistance parameter.

Optionally, the method for preparing an aperture also includes forming G3-continuous sub-arc segments on the housing or the blade to form a guide groove.

According to another aspect of the present invention, an aperture is provided. The aperture is manufactured and formed based on the preceding method for preparing an aperture, where a guide groove of the aperture is provided with at least two sub-arc segments, and a G3 continuity design is applied between two adjacent sub-arc segments.

Optionally, the guide groove is disposed on the housing or a blade of the aperture.

According to another aspect of the present invention, a camera module is provided and includes the preceding aperture.

According to another aspect of the present invention, an electronic device is provided. The electronic device includes at least one processor and a memory communicatively connected to the at least one processor. The memory stores a computer program executable by the at least one processor. The computer program is configured to, when executed by the at least one processor, cause the at least one processor to execute the preceding method for preparing an aperture.

In the technical solutions of the embodiments of the present invention, the guide groove path is calculated based on at least one of the acquired aperture stop, rotor motion parameter, guide post position, or blade parameter; in the case where the path inclination angle between the guide groove path and the guide post position does not meet the preset tilt angle specification, the guide groove path is segmented to establish at least two sub-arc segments, and a G3 continuity design is applied between two adjacent sub-arc segments. In this manner, the problem of oscillations in thrust torque and blade rotation stuttering caused by the discontinuity in curvature and radius of curvature in the existing aperture guide groove is addressed, and the dynamic performance of the aperture guide groove is enhanced. Moreover, oscillations in thrust torque and blade rotation stuttering caused by the discontinuity in curvature and radius of curvature in the aperture guide groove are avoided, and the design effect of the aperture is improved.

It is to be understood that the contents described in this part are not intended to identify key or important features of embodiments of the present invention and are not intended to limit the scope of the present invention. Other features of the present invention are apparent from the description provided hereinafter.

BRIEF DESCRIPTION OF DRAWINGS

To illustrate technical solutions in embodiments of the present invention more clearly, accompanying drawings used in the description of the embodiments are briefly described below. Apparently, the accompanying drawings described below illustrate part of embodiments of the present invention, and those of ordinary skill in the art may acquire other accompanying drawings based on the accompanying drawings described below on the premise that no creative work is done.

DETAILED DESCRIPTION

The solutions in embodiments of the present invention are described clearly and completely in conjunction with drawings in the embodiments of the present invention from which the solutions are better understood by those skilled in the art. Apparently, the embodiments described below are part, not all, of the embodiments of the present invention. Based on the embodiments described herein, all other embodiments acquired by those skilled in the art on the premise that no creative work is done are within the scope of the present invention.

It should be noted that the terms "comprising", "including", and any other variations in the description and claims of the present invention and the preceding drawings are intended to encompass a non-exclusive inclusion. For example, a process, method, system, product, or device that includes a series of steps or units not only includes the expressly listed steps or units but may also include other steps or units that are not expressly listed or are inherent to such a process, method, product, or device.

Figure 1:
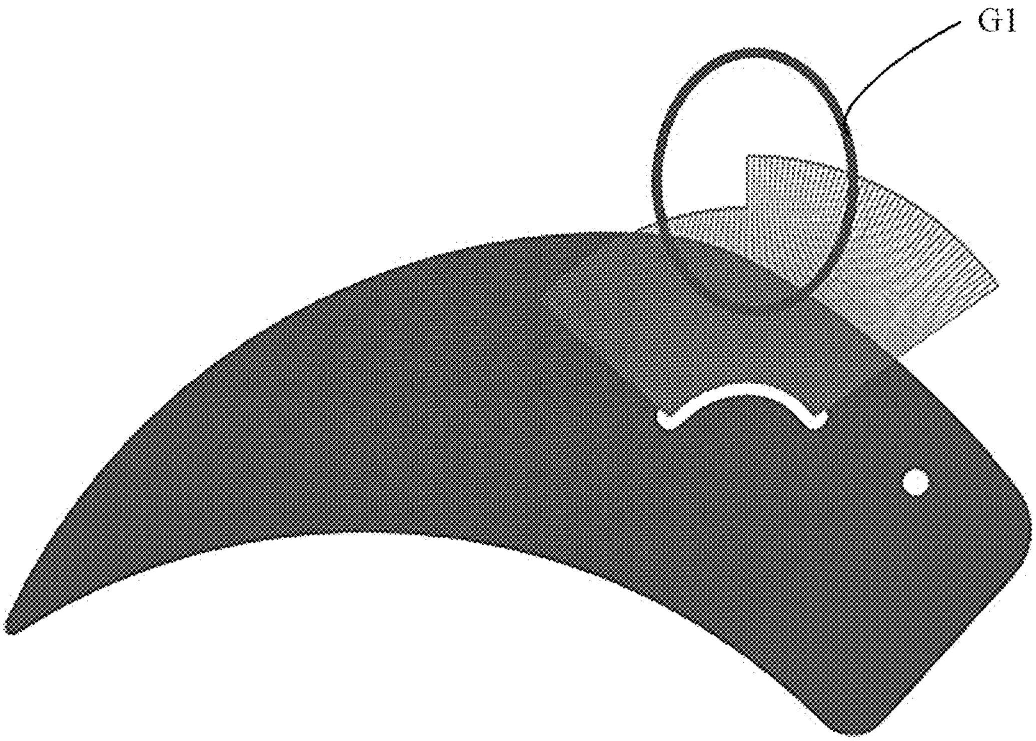
FIG. 1 is a diagram illustrating the structure of an existing aperture guide groove.
Figure 2:
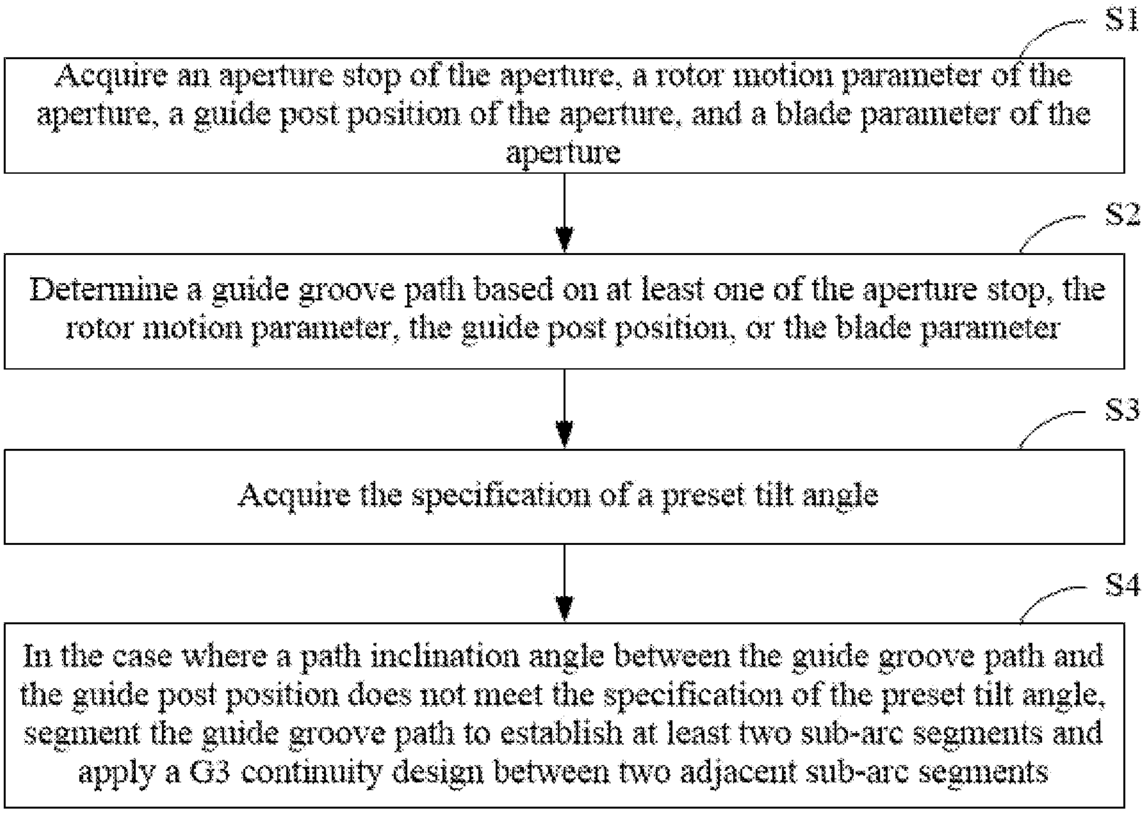
FIG. 2 is a flowchart of a method for preparing an aperture according to an embodiment of the present invention.
Figure 3:
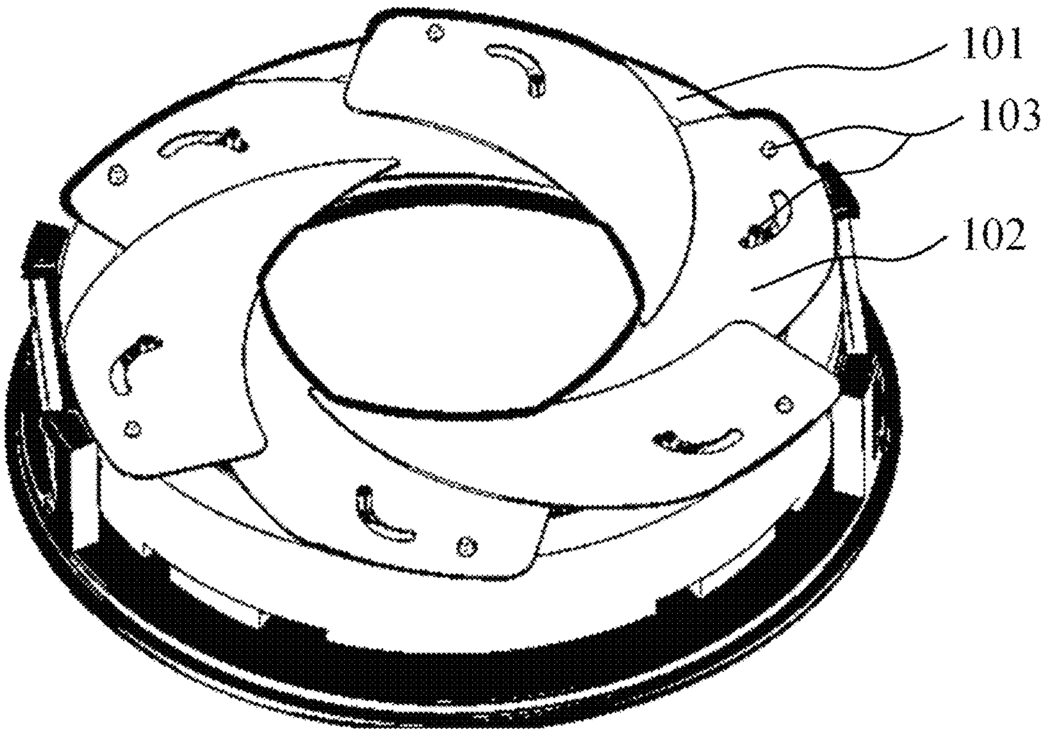
FIG. 3 is a diagram illustrating the structure of an aperture according to an embodiment of the present invention.

FIG. 2 is a flowchart of a method for preparing an aperture according to an embodiment of the present invention. FIG. 3 is a diagram illustrating the structure of an aperture according to an embodiment of the present invention. This embodiment is applicable to a design scenario of an aperture blade and an aperture guide groove. The method may be executed by an apparatus for preparing an aperture. The apparatus may be implemented in the form of software and/or hardware and may be configured in an independent electronic device.

With reference to FIG. 3, the aperture includes a housing (not shown in FIG. 3), a rotor 101 disposed in the housing, and multiple blades 102 annularly distributed on the rotor 101, and a guide post 103 is disposed on the rotor 101. In this embodiment, the guide post 103 includes a fixed guide post and a limiting guide post. The fixed guide post is used to secure a blade 102 to the rotor 101. The limiting guide post moves along the path defined by a guide groove to drive the blade 102 to rotate circumferentially around the fixed guide post.

With reference to FIGS. 2 and 3, the method for preparing an aperture according to the present application includes the following steps:

In S1, an aperture stop of the aperture, a rotor motion parameter of the aperture, a guide post position of the aperture, and a blade parameter of the aperture are acquired.

Aperture stops may be understood as stops corresponding to different light intake amounts. Typically, the aperture stops include but are not limited to F4.0, F2.0, F1.8, and F1.48. The larger the aperture stop, the smaller the corresponding aperture diameter (that is, light intake aperture). For example, when the aperture stop is F4.0, the corresponding aperture diameter (that is, light intake aperture) is 50 mm/4=12.5 mm; when the aperture stop is F2.0, the corresponding aperture diameter (that is, light intake aperture) is 50 mm/2=25 mm; when the aperture stop is F1.8, the corresponding aperture diameter (that is, light intake aperture) is 50 mm/1.8=28 mm; when the aperture stop is F1.48, the corresponding aperture diameter (that is, light intake aperture) is 50 mm/1.48=34 mm. In this embodiment, the aperture stop may be established based on the actual demand data of the aperture, such as light intake amount, depth of field, or other custom data.

The rotor may be understood as a rotatable apparatus connected to the aperture blades. The rotation of the rotor drives the opening and closing of the aperture blades, thereby changing the size of the aperture. The rotor motion parameter may be understood as a parameter that characterizes the motion state of the rotor. Typically, rotor motion parameters include but are not limited to the rotor speed, rotor rotation duration, and rotor rotation angle. In this embodiment, the rotor motion parameter may be established based on the actual demand data of the aperture (such as light intake amount, depth of field, or other custom data) and the aperture structure.

Guide post positions may be understood as the positions of a fixed point and a limiting structure provided during the rotation and opening or closing of the blade. The positions are used to secure the blade and ensure stable and reliable opening and closing actions of the blade. Typically, the guide post positions include but are not limited to the positions of the fixed guide post and the limiting guide post. In this embodiment, the guide post positions may be established based on factors such as the motion trajectory and force condition of the aperture blade, the focal length and aperture size of the camera lens, the adjustment range and precision of the aperture, and the overall structure and internal spatial layout of the imaging module. Thus, it is ensured that the blade is evenly stressed, moves smoothly, and does not interfere with other components during opening and closing.

The blade parameter may be understood as a parameter that characterizes the outer structure of the aperture blade. Typically, blade parameters include but are not limited to a blade shape, the number of blades, and the inner arc length of the blade. In this embodiment, the blade parameter may be established based on factors such as actual demand data (such as light intake amount, depth of field, or other custom data) of the aperture, imaging effects, and manufacturing dimensions, so as to ensure stable and smooth blade movement during opening and closing under the premise of maintaining imaging effect.

In some embodiments, after acquiring the aperture stop, the rotor motion parameter, the guide post position, and the blade parameter, the method for preparing an aperture according to the present application also includes detecting whether interference occurs between the blades or between the blades and the rotor. If interference is detected, the guide post positions and blade parameters are adjusted accordingly.

In S2, a guide groove path is determined based on at least one of the aperture stop, the rotor motion parameter, the guide post position, or the blade parameter.

The guide groove path is the trajectory along which the aperture blade moves during the opening and closing process.

Specifically, the methods for designing the guide groove path include but are not limited to any of the following: designing the trajectory dimensions (such as arc length and radian) based on the blade shape (typically, arc-shaped or polygonal) and the number of blades the aperture blades; designing the trajectory shape (such as circular or arc-shaped) of the guide groove based on the aperture stop and rotor motion parameter; determining the layout position of the guide groove based on the guide groove positions.

In some embodiments, determining the guide groove path based on at least one of the aperture stop, the rotor motion parameter, the guide post position, or the blade parameter includes acquiring the maximum stop of the aperture stop, the intermediate stop of the aperture stop, and the minimum stop of the aperture stop; and determining the guide groove path based on the aperture diameter corresponding to the maximum stop, the aperture diameter corresponding to the intermediate stop, and the aperture diameter corresponding to the minimum stop. For example, an example is used where aperture stops include F4.0, F2.0, F1.8, F1.48, and F1.0. The trajectory of the guide groove may be determined based on the aperture diameter corresponding to F4.0, the aperture diameter corresponding to F1.8, and the aperture diameter corresponding to F1.0.

In S3, the preset tilt angle specification is acquired.

Figure 4:
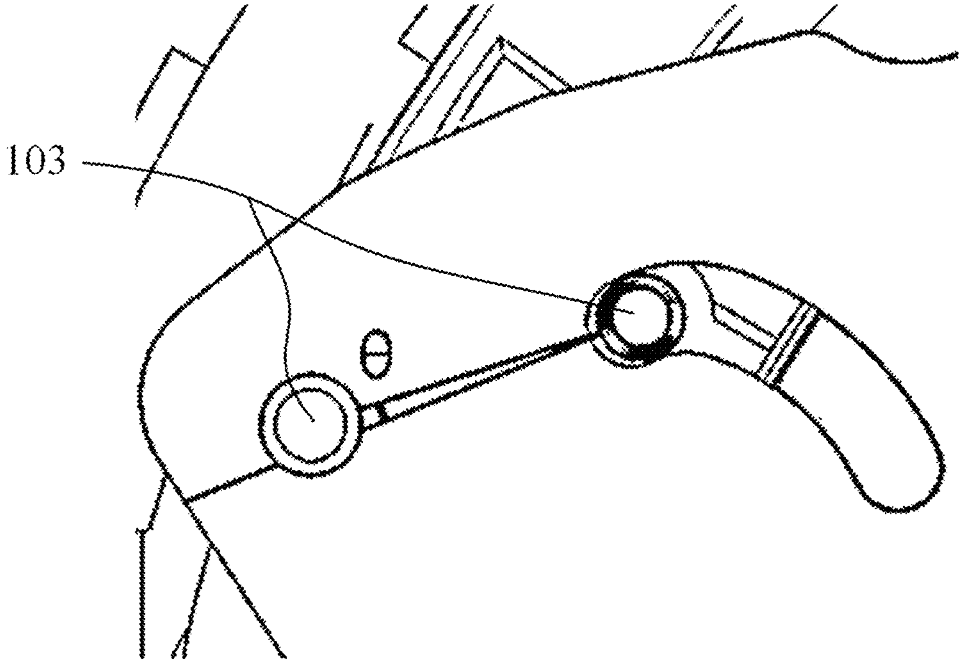
FIG. 4 is a diagram illustrating a path inclination angle under an aperture stop according to an embodiment of the present invention.
Figure 5:
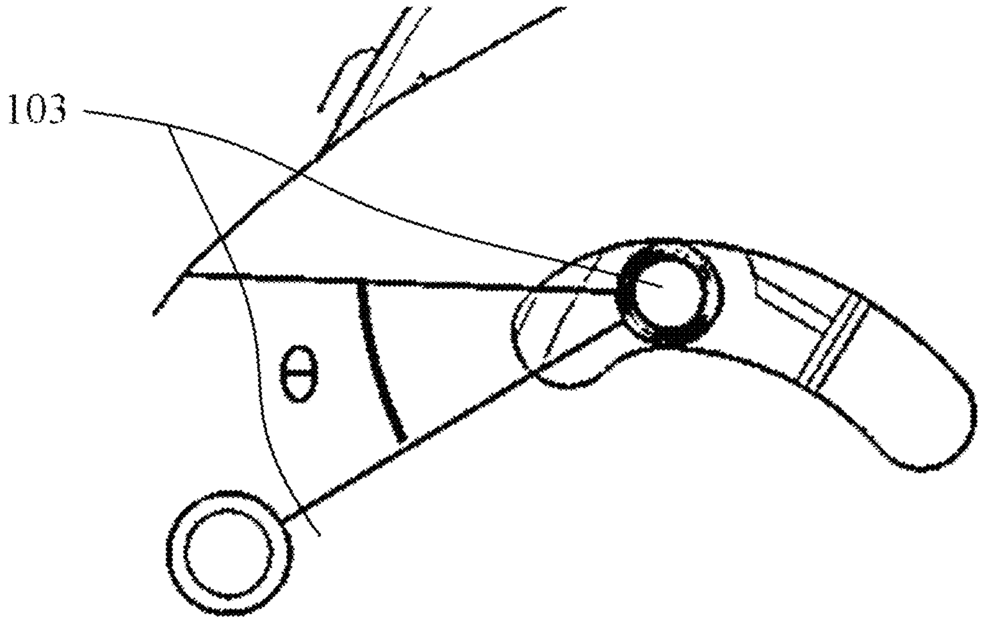
FIG. 5 is a diagram illustrating a path inclination angle under another aperture stop according to an embodiment of the present invention.
Figure 6:
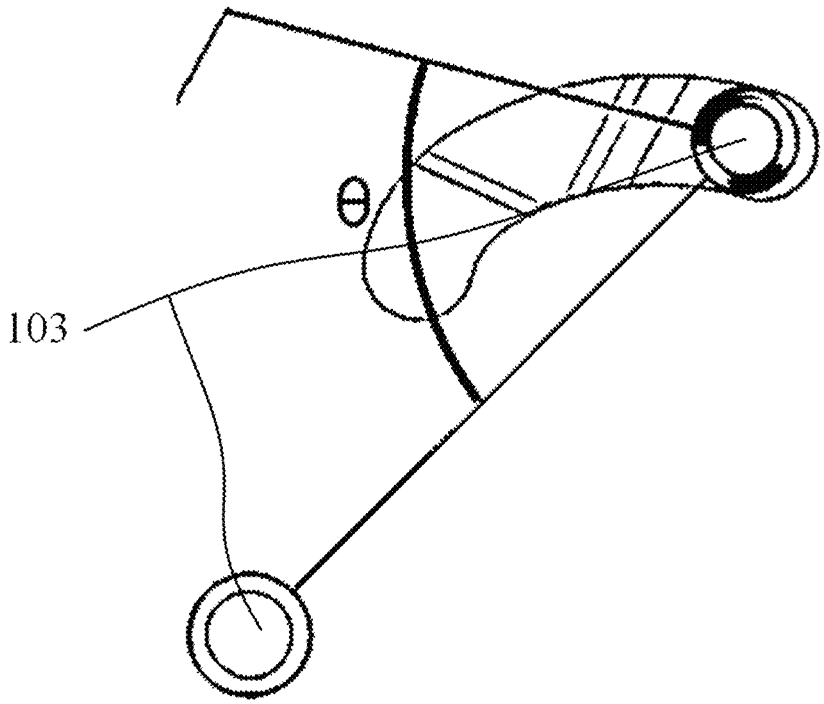
FIG. 6 is a diagram illustrating a path inclination angle under another aperture stop according to an embodiment of the present invention.

The tilt angle may be understood as a path inclination angle formed between the guide groove path and the guide post position under different aperture stops. FIG. 4 is a diagram illustrating a path inclination angle under an aperture stop according to an embodiment of the present invention. FIG. 5 is a diagram illustrating a path inclination angle under another aperture stop according to an embodiment of the present invention. FIG. 6 is a diagram illustrating a path inclination angle under another aperture stop according to an embodiment of the present invention. With reference to FIGS. 4 to 6, the path inclination angle θ may be defined as an angle formed between the tangent of the guide groove path and a line connecting the fixed guide post and the limiting guide post.

The preset tilt angle specification may be understood as the range of path inclination angles that do not cause an obstruction in the rotation process of the blade. Exemplarily, the preset tilt angle specification may be designed as follows: $\theta_{min} \leq \theta \leq \theta_{max}$. $\theta_{min}$ denotes the lower limit of the path inclination angle that ensures stable and smooth opening and closing movement of the blade, and $\theta_{max}$ denotes the upper limit of the path inclination angle that ensures stable and smooth opening and closing movement of the blade.

Optionally, acquiring the preset tilt angle specification includes acquiring a resistance parameter of a blade rotating along the guide groove path; and determining the preset tilt angle specification based on the resistance parameter. The resistance parameter is established based on the source of force that impedes the rotation of the blade along the guide groove path. Typically, the resistance parameter includes but is not limited to the coefficient of friction between the guide post and the guide groove. Specifically, a corresponding relationship between the resistance parameter and the preset tilt angle specification may be established based on calibration data. During the design process, by measuring the coefficient of friction between the guide post and the guide groove, the preset tilt angle specification can be determined by referencing a lookup table.

In S4, in the case where a path inclination angle between the guide groove path and the guide post position does not meet the preset tilt angle specification, the guide groove path is segmented to establish at least two sub-arc segments, and a G3 continuity design is applied between two adjacent sub-arc segments.

Figure 7:
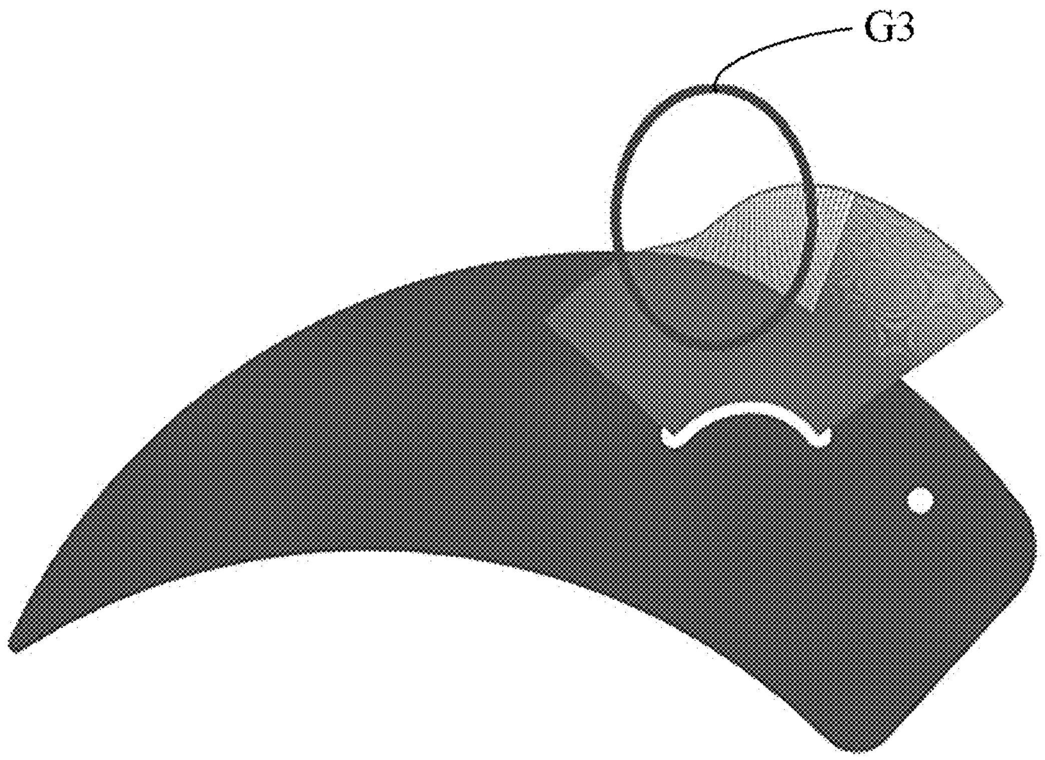
FIG. 7 is a diagram illustrating the structure of a G3-continuous guide groove according to an embodiment of the present invention.

G3 continuity indicates that the curve or curves are continuous everywhere, with continuous third-order derivatives. In other words, the curvatures of two adjacent sub-arc segments are tangent-continuous. FIG. 7 is a diagram illustrating the structure of a G3-continuous guide groove according to an embodiment of the present invention. As shown in FIG. 7, the curve designed with G3 continuity exhibits smooth and continuous curvature changes.

Specifically, in the aperture design process, an aperture stop, a rotor motion parameter, a guide post position, and a blade parameter are first designed; then a guide groove path is preliminarily calculated in combination with at least one of the aperture stop, the rotor motion parameter, the guide post position, or the blade parameter; in the case where a path inclination angle between the guide groove path and the guide post position does not meet the preset tilt angle specification, the guide groove path is segmented to establish at least two sub-arc segments, and a G3 continuity design is applied between two adjacent sub-arc segments. By introducing the G3 continuity design in the guide groove path, the problem of oscillations in thrust torque and blade rotation stuttering caused by the discontinuity in curvature and radius of curvature in the existing aperture guide groove is addressed, and the dynamic performance of the aperture guide groove is enhanced. Moreover, oscillations in thrust torque and blade rotation stuttering caused by the discontinuity in curvature and radius of curvature in the aperture guide groove are avoided, and the design effect of the aperture is improved.

In some embodiments, acquiring the aperture stop, the rotor motion parameter, the guide post position, and the blade parameter of the aperture includes determining the aperture stop and the aperture diameter corresponding to the aperture stop based on demand data of a camera module. The demand data of the camera module includes but is not limited to the usage scenarios of the camera module, lens resolution, lens focal length, and the size of the photosensitive element. Specifically, the demand for light intake amount is calculated based on the demand data of the camera module, and the aperture stop is configured based on the aperture diameter corresponding to the demand for light intake amount.

In some embodiments, acquiring the aperture stop, the rotor motion parameter, the guide post position, and the blade parameter of the aperture includes determining the guide post position based on the aperture diameter and the constraint dimension of the housing. Specifically, the blade motion trajectory may be designed in combination with the aperture diameter and the constraint dimension of the housing so that during opening and closing, the blade is evenly stressed, moves smoothly, and does not interfere with other components.

In some embodiments, acquiring the aperture stop, the rotor motion parameter, the guide post position, and the blade parameter of the aperture includes determining the rotor motion parameter based on aperture rotation thrust, the aperture diameter, and an inner arc of a blade. The aperture rotation thrust may refer to the force applied to the blade during rotor rotation, and the force is used to drive the rotation of the blade. Specifically, the aperture diameter and the inner arc of the blade are used to design the motion trajectory of the rotor rotation motion. The aperture rotation thrust is greater than the resistance along this trajectory, and it is ensured that the blade performs stable and smooth opening and closing rotation.

Figure 8:
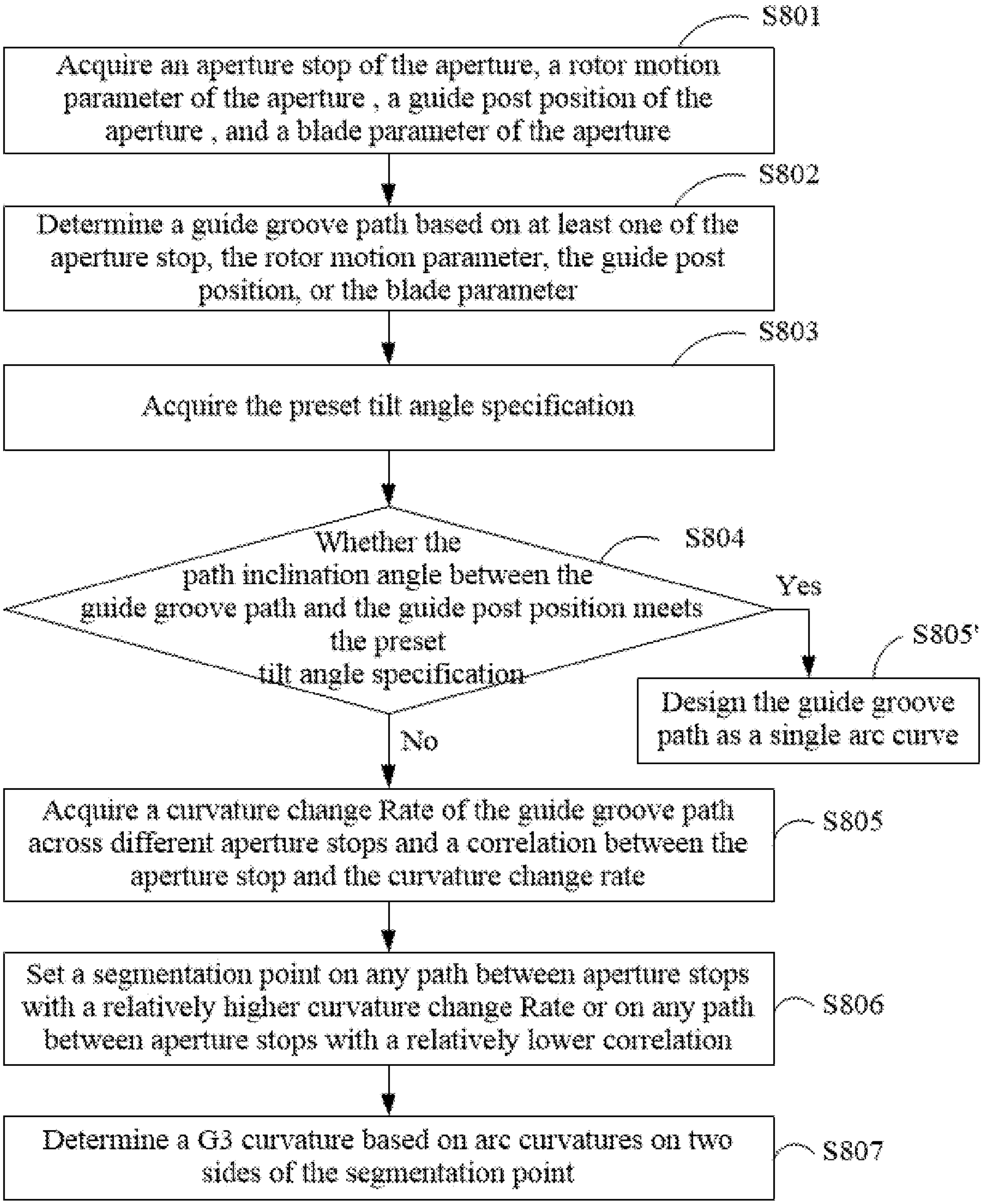
FIG. 8 is another flowchart of the method for preparing an aperture according to an embodiment of the present invention.

FIG. 8 is another flowchart of the method for preparing an aperture according to an embodiment of the present invention. Based on the embodiment shown in FIG. 2, FIG. 8 exemplifies a specific embodiment of a method of an arc segmentation and G3 continuity design. With reference to FIG. 8, the method for preparing an aperture in the present application specifically includes the following:

In S801, an aperture stop of the aperture, a rotor motion parameter of the aperture, a guide post position of the aperture, and a blade parameter of the aperture are acquired.

In S802, a guide groove path is determined based on at least one of the aperture stop, the rotor motion parameter, the guide post position, or the blade parameter.

In S803, the preset tilt angle specification is acquired.

In S804, it is determined whether the path inclination angle between the guide groove path and the guide post position meets the preset tilt angle specification.

If the path inclination angle between the guide groove path and the guide post position does not meet the preset tilt angle specification, S805 is executed; if the path inclination angle between the guide groove path and the guide post position meets the preset tilt angle specification, S805' is executed.

In S805', the guide groove path is designed as a single arc curve.

In S805, the curvature change rate of the guide groove path across different aperture stops and a correlation between the aperture stop and the curvature change rate are acquired.

The curvature change rate is used to characterize the of curvature change degree, and the correlation between the aperture stop and the curvature change rate is used to characterize the extent to which aperture stop changes affect the curvature change. The higher the correlation between the aperture stop and the curvature change rate, the greater the impact of the stop change on curvature change.

In S806, a segmentation point is set on any path between aperture stops with a relatively higher curvature change rate or on any path between aperture stops with relatively lower correlations.

In S807, a G3 curvature is determined based on arc curvatures on two sides of the segmentation point.

Specifically, with reference to FIG. 4 to 6, after the guide groove path is preliminarily designed based on aperture stops, the path inclination angles θ between the guide groove path and the guide post position under different aperture stops are calculated. If the path inclination angle θ at any position under any aperture stop does not meet the preset tilt angle specification (for example, $\theta<\theta_{min}$ or $\theta>\theta_{max}$), the guide groove path is segmented. For example, an example is used where a guide groove path is designed based on three aperture stops (such as F4.0, F1.8, and F1.0). The curvature change rate of the curve between F4.0 and F1.8 and the curvature change rate of the curve between F1.8 and F1.0 are calculated. If the curvature change rate of the curve between F4.0 and F1.8 is greater than the curvature change rate of the curve between F1.8 and F1.0, a segmentation point is set at any position on the curve between F4.0 and F1.8, the arc curvatures on two sides of the segmentation point are calculated, and the G3 curvature is designed to ensure that the arc curvatures on two sides of the segmentation point are tangently connected. Alternatively, the correlations between F4.0, F1.8, and F1.0 and the curvature change rates are calculated. If the correlation between F4.0 and the curvature change rate is higher than the correlation between F1.0 and the curvature change rate, a segmentation point is set at any position on the curve between F4.0 and F1.8, the arc curvatures on two sides of the segmentation point are calculated, and the G3 curvature is designed to ensure that the arc curvatures on two sides of the segmentation point are tangently connected. By combining the curvature change rates between different aperture stops or the extent to which stop changes affect curvature change, the guide groove path is segmented, the position of G3 continuity on the guide groove path is optimized, and the dynamic performance of the aperture guide groove is further improved.

Figure 9:
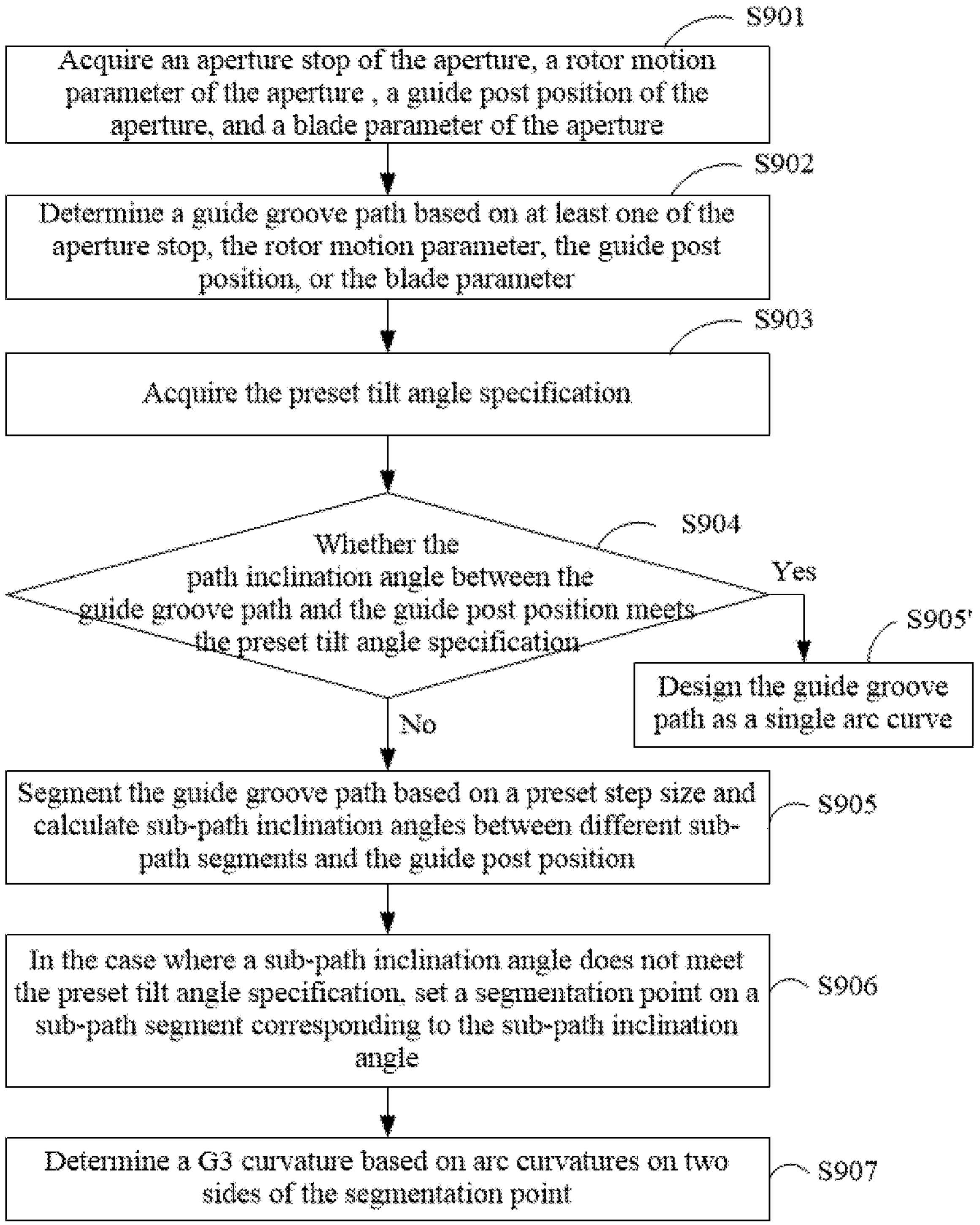
FIG. 9 is another flowchart of the method for preparing an aperture according to an embodiment of the present invention.

FIG. 9 is another flowchart of the method for preparing an aperture according to an embodiment of the present invention. Based on the embodiment shown in FIG. 2, FIG. 9 exemplifies a specific embodiment of a method of an arc segmentation and G3 continuity design. With reference to FIG. 9, the method for preparing an aperture in the present application specifically includes the following:

In S901, an aperture stop of the aperture, a rotor motion parameter of the aperture, a guide post position of the aperture, and a blade parameter of the aperture are acquired.

In S902, a guide groove path is determined based on at least one of the aperture stop, the rotor motion parameter, the guide post position, or the blade parameter.

In S903, the preset tilt angle specification is acquired.

In S904, it is determined whether the path inclination angle between the guide groove path and the guide post position meets the preset tilt angle specification.

If the path inclination angle between the guide groove path and the guide post position does not meet the preset tilt angle specification, S905 is executed; if the path inclination angle between the guide groove path and the guide post position meets the preset tilt angle specification, S905' is executed.

In S905', the guide groove path is designed as a single arc curve.

In S905, the guide groove path is segmented based on a preset step size, and sub-path inclination angles between different sub-path segments and the guide post position are calculated.

The preset step size may be established based on the arc length and radian of the guide groove or based on custom data. No limitation is imposed on the specific value.

In S906, in the case where a sub-path inclination angle does not meet the preset tilt angle specification, a segmentation point is set on a sub-path segment corresponding to the sub-path inclination angle.

In S907, a G3 curvature is determined based on arc curvatures on two sides of the segmentation point.

Specifically, with reference to FIG. 4 to 6, after the guide groove path is preliminarily designed based on aperture stops, the path inclination angles θ between the guide groove path and the guide post position under different aperture stops are calculated. If a path inclination angle θ at any position under any aperture stop does not meet the preset tilt angle specification (for example, $\theta<\theta_{min}$ or $\theta>\theta_{max}$), the guide groove path is segmented based on a preset step size, and the sub-path inclination angles between different sub-path segments and the guide post position are calculated. If a sub-path inclination angle does not meet the preset tilt angle specification, a segmentation point is set on the sub-path segment corresponding to the sub-path inclination angle, the arc curvatures on two sides of the segmentation point are calculated, and the G3 curvature is designed so that the arc curvatures on two sides of the segmentation point are tangently connected. By calculating the path inclination angles on the guide groove path in segments, multiple segmentation points may be added to the guide groove path to enhance the precision of the G3 continuity design and further improve the dynamic performance of the aperture guide groove.

Figure 10:
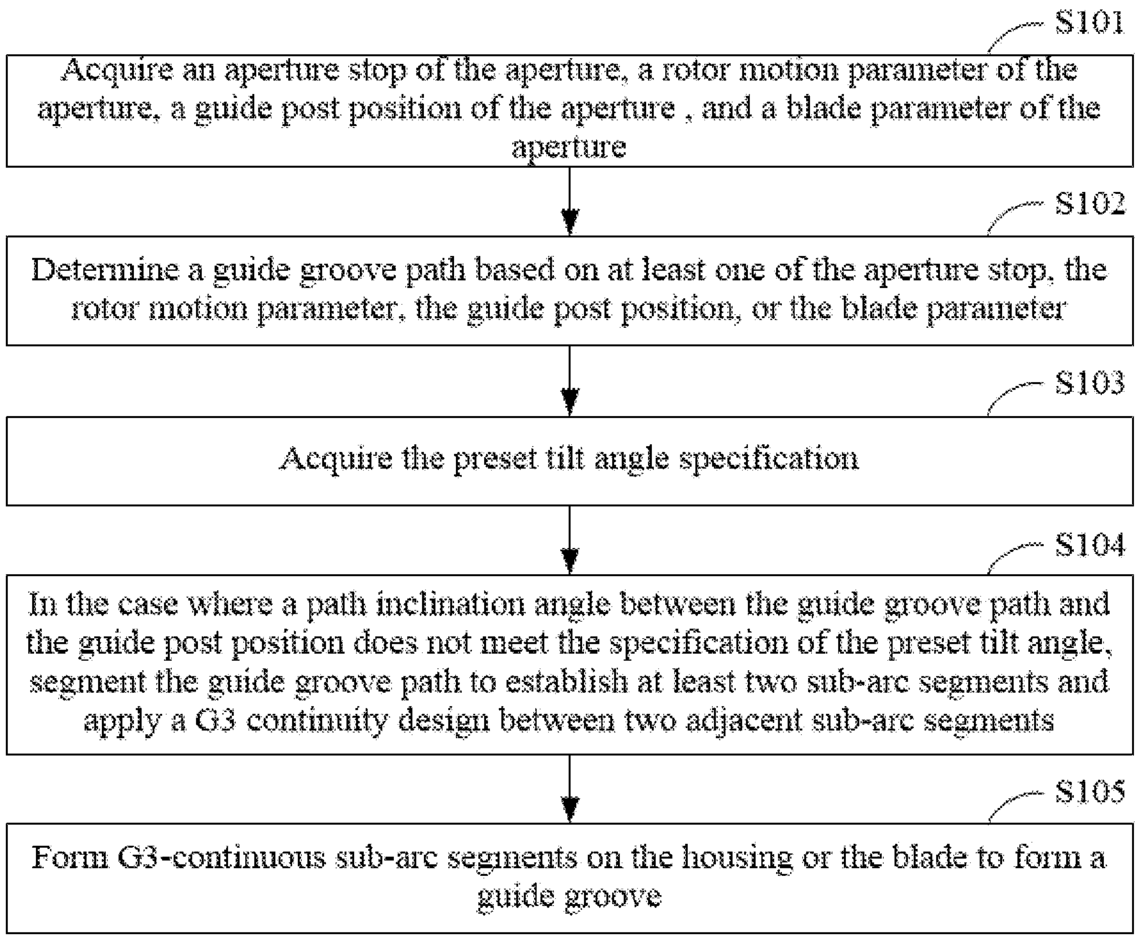
FIG. 10 is another flowchart of the method for preparing an aperture according to an embodiment of the present invention.

FIG. 10 is another flowchart of the method for preparing an aperture according to an embodiment of the present invention. Based on the embodiment shown in FIG. 2, FIG. 10 exemplifies a specific embodiment of the arrangement position of the guide groove. With reference to FIG. 10, the method for preparing an aperture in the present application specifically includes the following steps:

In S101, an aperture stop of the aperture, a rotor motion parameter of the aperture, a guide post position of the aperture, and a blade parameter of the aperture are acquired.

In S102, a guide groove path is determined based on at least one of the aperture stop, the rotor motion parameter, the guide post position, or the blade parameter.

In S103, the preset tilt angle specification is acquired.

In S104, in the case where a path inclination angle between the guide groove path and the guide post position does not meet the preset tilt angle specification, the guide groove path is segmented to establish at least two sub-arc segments, and a G3 continuity design is applied between two adjacent sub-arc segments.

In S105, G3-continuous sub-arc segments are formed on the housing or the blade to form a guide groove.

Specifically, with reference to the preceding embodiments, after the G3-continuous guide groove path is obtained, the G3-continuous guide groove path may be arranged on the housing or the blade to form a guide groove. This groove provides the travel space for the rotational movement of the blade, thereby expanding the application scenarios of the G3-continuous guide groove path and enhancing the flexibility of aperture design.

Based on the same inventive concept as that of any of the preceding embodiments, an embodiment of the present invention also provides an aperture. The aperture is manufactured and formed based on the preceding method for preparing an aperture, where a guide groove of the aperture is provided with at least two sub-arc segments, and a G3 continuity design is applied between two adjacent sub-arc segments.

Optionally, the G3-continuous guide groove of the present application may be disposed on the housing or a blade of the aperture.

Based on the same inventive concept as that of any of the preceding embodiments, an embodiment of the present invention also provides a camera module. The camera module includes the preceding aperture. A guide groove of the aperture is provided with at least two sub-arc segments, and a G3 continuity design is applied between two adjacent sub-arc segments.

In this embodiment, the camera module includes but is not limited to a mobile phone camera module, a vehicle camera module, a smart home appliance camera module, a camera camera module, and a surveillance camera camera module.

Based on the same inventive concept as that of any of the preceding embodiments, an embodiment of the present invention also provides an electronic device. The electronic device includes at least one processor and a memory communicatively connected to the at least one processor. The memory stores a computer program executable by the at least one processor. The computer program is configured to, when executed by the at least one processor, cause the at least one processor to execute the preceding method for preparing an aperture described in any of the preceding embodiments.

Figure 11:
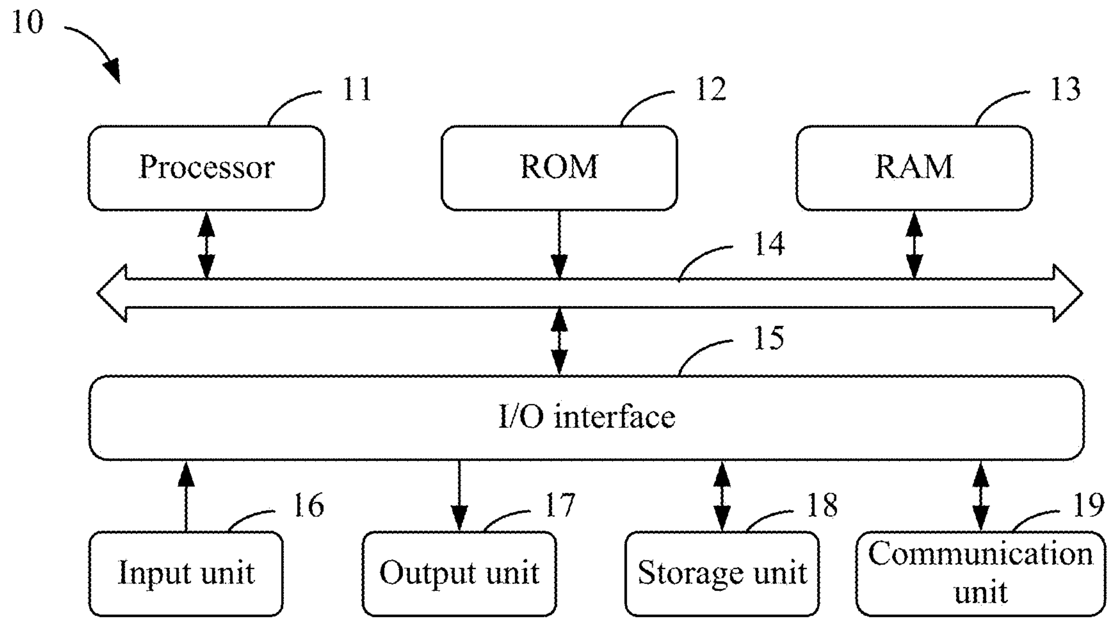
FIG. 11 is a diagram illustrating the structure of an electronic device for implementing a method for preparing an aperture according to an embodiment of the present invention.

FIG. 11 is a diagram illustrating the structure of an electronic device for implementing a method for preparing an aperture according to an embodiment of the present invention. The electronic device is intended to represent various forms of digital computers, for example, a laptop computer, a desktop computer, a worktable, a personal digital assistant, a server, a blade server, a mainframe computer, or other applicable computers. The electronic device may also represent various forms of mobile apparatuses such as a personal digital processing apparatus, a cellular phone, a smart phone, a wearable device (for example, a helmet, glasses, and a watch), and other similar computing apparatuses. The components shown herein, their connections and relationships, and their functions, are by way of examples only and are not intended to limit implementations of the present invention described and/or claimed herein.

As shown in FIG. 11, the electronic device 10 includes at least one processor 11 and a memory in a communication connection with the at least one processor 11, such as a read-only memory (ROM) 12 and a random-access memory (RAM) 13. The memory stores a computer program executable by the at least one processor. The processor 11 may perform various appropriate actions and processes according to computer programs stored in a read-only memory (ROM) 12 or loaded from a storage unit 18 into a random-access memory (RAM) 13. The RAM 13 may also store various programs and data required for the operation of the electronic device 10. The processor 11, the ROM 12, and the RAM 13 are connected to each other through a bus 14. An input/output (I/O) interface 15 is also connected to the bus 14.

Multiple components in the electronic device 10 are connected to the I/O interface 15, including an input unit 16, such as a keyboard or a mouse; an output unit 17, such as various types of displays or speakers; a storage unit 18, such as a magnetic disk or an optical disk; and a communication unit 19, such as a network card, a modem, or a wireless communication transceiver. The communication unit 19 allows the electronic device 10 to exchange information/data with other devices through a computer network such as the Internet and/or various telecommunication networks.

The processor 11 may be various general-purpose and/or special-purpose processing components having processing and computing capabilities. Some examples of the processor 11 include but are not limited to, a central processing unit (CPU), a graphics processing unit (GPU), various dedicated artificial intelligence (AI) computing chips, various processors running machine learning model algorithms, a digital signal processor (DSP), and any suitable processors, controllers, and microcontrollers. The processor 11 performs various methods and processes described above, such as a method for preparing an aperture.

In some embodiments, the method for preparing an aperture may be implemented as a computer program tangibly embodied in a computer-readable storage medium such as the storage unit 18. In some embodiments, part or all of the computer program may be loaded and/or installed on the electronic device 10 via the ROM 12 and/or the communication unit 19. When the computer program is loaded into the RAM 13 and executed by the processor 11, one or more steps of the method for preparing an aperture described above may be performed. Optionally, in other embodiments, the processor 11 may be configured to perform the method for preparing an aperture by any other suitable means (for example, by means of firmware).

Various implementations of the systems and techniques described above herein may be implemented in digital electronic circuitry, integrated circuitry, a field programmable gate array (FPGA), an application specific integrated circuit (ASIC), an application specific standard product (ASSP), a system on chip (SOC), a complex programmable logic device (CPLD), a computer hardware, a firmware, a software, and/or combinations thereof. The various implementations may include an implementation in one or more computer programs that may be executable and/or interpretable on a programmable system including at least one programmable processor. The programmable processor may be special-purpose or general-purpose for receiving data and instructions from a memory system, at least one input apparatus, and at least one output apparatus and transmitting the data and instructions to the memory system, the at least one input apparatus, and the at least one output apparatus.

The computer program for implementing the method of the present invention may be written in any combination of one or more programming languages. These computer programs may be provided to a processor of a general-purpose computer, special-purpose computer, or other programmable data processing apparatus such that the computer programs, when executed by the processor, causes the functions/operations specified in flowcharts and/or block diagrams to be implemented. The computer program may be executed entirely or partly on the machine, as a stand-alone software package partly on the machine and partly on a remote machine, or entirely on the remote machine or server.

In the context of the present invention, a computer-readable storage medium may be a tangible medium that may contain or store a computer program for use by or in conjunction with an instruction execution system, apparatus, or device. The computer-readable storage medium may include, but is not limited to, electronic, magnetic, optical, electromagnetic, infrared, or semiconductor systems, apparatuses, or devices, or any suitable combination thereof. Optionally, the computer-readable storage medium may be a machine-readable signal medium. Examples of the machine-readable storage medium may include an electrical connection based on one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any appropriate combination thereof.

To provide interaction with a user, the systems and techniques described herein may be implemented on an electronic device. The electronic device has a display apparatus (for example, CRT (cathode ray tube) or LCD (liquid crystal display) monitor) for displaying information to the user; and a keyboard and pointing apparatus (for example, a mouse or a trackball) through which a user can provide input to the electronic device. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

The computing system may include a client and a server. A client and a server are generally remote from each other and typically interact through a communication network. The relationship between the client and the server arises by virtue of computer programs running on respective computers and having a client-server relationship to each other. The server, which may be a cloud server and is also referred to as a cloud computing server or a cloud host, is a host product in a cloud computing service system. The server solves the problems of difficult management and weak service scalability in the service of a related physical host and a related VPS.

It is to be understood that various forms of processes shown above may be adopted with steps reordered, added, or deleted. For example, the steps described in the present invention may be performed in parallel, sequentially, or in different orders, as long as the desired results of the technical solutions of the present invention can be achieved, and no limitation is imposed herein.

The preceding embodiments do not limit the scope of the present invention. It is to be understood by those skilled in the art that various modifications, combinations, sub-combinations, and substitutions may be performed according to design requirements and other factors. Any modifications, equivalent substitutions, improvements, and the like made within the spirit and principle of the present invention are within the scope of the present invention.

What is claimed is:

1. A method for preparing an aperture, wherein the aperture comprises a housing, a rotor disposed in the housing, and a plurality of blades annularly distributed on the rotor, wherein a guide post is disposed on the rotor, and the method comprises:

acquiring an aperture stop of the aperture, a rotor motion parameter of the aperture, a guide post position of the aperture, and a blade parameter of the aperture;

determining a guide groove path based on at least one of the aperture stop, the rotor motion parameter, the guide post position, or the blade parameter;

acquiring a preset tilt angle specification; and in a case where a path inclination angle between the guide groove path and the guide post position does not meet the preset tilt angle specification, segmenting the guide groove path to establish at least two sub-arc segments, and applying a G3 continuity design between two adjacent sub-arc segments of the at least two sub-arc segments.

2. The method for preparing an aperture according to claim 1, wherein in the case where the path inclination angle between the guide groove path and the guide post position does not meet the preset tilt angle specification, segmenting the guide groove path to establish the at least two sub-arc segments and applying the G3 continuity design between the two adjacent sub-arc segments comprises:

acquiring a curvature change rate of the guide groove path across different aperture stops and a correlation between the aperture stop and the curvature change rate;

setting a segmentation point on any path between aperture stops with a relatively higher curvature change rate or on any path between aperture stops with a relatively lower correlation; and determining a G3 curvature based on arc curvatures on two sides of the segmentation point.

3. The method for preparing an aperture according to claim 2, further comprising:

forming G3-continuous sub-arc segments of the at least two sub-arc segments on the housing or a blade of the plurality of blades to form a guide groove.

4. The method for preparing an aperture according to claim 1, wherein in the case where the path inclination angle between the guide groove path and the guide post position does not meet the preset tilt angle specification, segmenting the guide groove path to establish the at least two sub-arc segments and applying the G3 continuity design between the two adjacent sub-arc segments further comprises:

segmenting the guide groove path based on a preset step size, and calculating sub-path inclination angles between different sub-path segments and the guide post position;

in a case where a sub-path inclination angle of the sub-path inclination angles does not meet the preset tilt angle specification, setting a segmentation point on a sub-path segment corresponding to the sub-path inclination angle; and determining a G3 curvature based on arc curvatures on two sides of the segmentation point.

5. The method for preparing an aperture according to claim 4, further comprising:

forming G3-continuous sub-arc segments of the at least two sub-arc segments on the housing or a blade of the plurality of blades to form a guide groove.

6. The method for preparing an aperture according to claim 1, wherein determining the guide groove path based on at least one of the aperture stop, the rotor motion parameter, the guide post position, or the blade parameter comprises:

acquiring a maximum stop of the aperture stop, an intermediate stop of the aperture stop, and a minimum stop of the aperture stop; and determining the guide groove path based on an aperture diameter corresponding to the maximum stop, an aperture diameter corresponding to the intermediate stop, and an aperture diameter corresponding to the minimum stop.

7. The method for preparing an aperture according to claim 6, further comprising:

forming G3-continuous sub-arc segments of the at least two sub-arc segments on the housing or a blade of the plurality of blades to form a guide groove.

8. The method for preparing an aperture according to claim 1, wherein acquiring the aperture stop of the aperture, the rotor motion parameter of the aperture, the guide post position of the aperture, and the blade parameter of the aperture comprises at least one of:

determining the aperture stop and an aperture diameter corresponding to the aperture stop based on demand data of a camera module;

determining the guide post position based on an aperture diameter and a constraint dimension of the housing; or determining the rotor motion parameter based on aperture rotation thrust, an aperture diameter, and an inner arc of a blade of the plurality of blades.

9. The method for preparing an aperture according to claim 8, further comprising:

forming G3-continuous sub-arc segments of the at least two sub-arc segments on the housing or a blade of the plurality of blades to form a guide groove.

10. The method for preparing an aperture according to claim 1, wherein acquiring the preset tilt angle specification comprises:

acquiring a resistance parameter of a blade of the plurality of blades rotating along the guide groove path; and determining the preset tilt angle specification based on the resistance parameter.

11. The method for preparing an aperture according to claim 10, further comprising:

forming G3-continuous sub-arc segments of the at least two sub-arc segments on the housing or a blade of the plurality of blades to form a guide groove.

12. The method for preparing an aperture according to claim 1, further comprising:

forming G3-continuous sub-arc segments of the at least two sub-arc segments on the housing or a blade of the plurality of blades to form a guide groove.

13. An aperture, manufactured and formed based on a method for preparing an aperture, wherein a guide groove of the aperture is provided with at least two sub-arc segments, and a G3 continuity design is applied between two adjacent sub-arc segments of the at least two sub-arc segments;

wherein the aperture comprises a housing, a rotor disposed in the housing, and a plurality of blades annularly distributed on the rotor, wherein a guide post is disposed on the rotor, and the method comprises:

acquiring an aperture stop of the aperture, a rotor motion parameter of the aperture, a guide post position of the aperture, and a blade parameter of the aperture;

determining a guide groove path based on at least one of the aperture stop, the rotor motion parameter, the guide post position, or the blade parameter;

acquiring a preset tilt angle specification; and in a case where a path inclination angle between the guide groove path and the guide post position does not meet the preset tilt angle specification, segmenting the guide groove path to establish at least two sub-arc segments, and applying a G3 continuity design between two adjacent sub-arc segments of the at least two sub-arc segments.

14. The aperture according to claim 13, wherein in the case where the path inclination angle between the guide groove path and the guide post position does not meet the preset tilt angle specification, segmenting the guide groove path to establish the at least two sub-arc segments and applying the G3 continuity design between the two adjacent sub-arc segments comprises:

acquiring a curvature change rate of the guide groove path across different aperture stops and a correlation between the aperture stop and the curvature change rate;

setting a segmentation point on any path between aperture stops with a relatively higher curvature change rate or on any path between aperture stops with a relatively lower correlation; and determining a G3 curvature based on arc curvatures on two sides of the segmentation point.

15. The aperture according to claim 13, wherein in the case where the path inclination angle between the guide groove path and the guide post position does not meet the preset tilt angle specification, segmenting the guide groove path to establish the at least two sub-arc segments and applying the G3 continuity design between the two adjacent sub-arc segments further comprises:

segmenting the guide groove path based on a preset step size, and calculating sub-path inclination angles between different sub-path segments and the guide post position;

in a case where a sub-path inclination angle of the sub-path inclination angles does not meet the preset tilt angle specification, setting a segmentation point on a sub-path segment corresponding to the sub-path inclination angle; and determining a G3 curvature based on arc curvatures on two sides of the segmentation point.

16. The aperture according to claim 13, wherein determining the guide groove path based on at least one of the aperture stop, the rotor motion parameter, the guide post position, or the blade parameter comprises:

acquiring a maximum stop of the aperture stop, an intermediate stop of the aperture stop, and a minimum stop of the aperture stop; and determining the guide groove path based on an aperture diameter corresponding to the maximum stop, an aperture diameter corresponding to the intermediate stop, and an aperture diameter corresponding to the minimum stop.

17. The aperture according to claim 13, wherein acquiring the aperture stop of the aperture, the rotor motion parameter of the aperture, the guide post position of the aperture, and the blade parameter of the aperture comprises at least one of:

determining the aperture stop and an aperture diameter corresponding to the aperture stop based on demand data of a camera module;

determining the guide post position based on an aperture diameter and a constraint dimension of the housing; or determining the rotor motion parameter based on aperture rotation thrust, an aperture diameter, and an inner arc of a blade of the plurality of blades.

18. The aperture according to claim 13, wherein acquiring the preset tilt angle specification comprises:

acquiring a resistance parameter of a blade of the plurality of blades rotating along the guide groove path; and determining the preset tilt angle specification based on the resistance parameter.

19. A camera module, comprising the aperture according to claim 13.

20. An electronic device, comprising:

at least one processor and a memory communicatively connected to the at least one processor;

wherein the memory stores a computer program executable by the at least one processor, and the computer program is configured to, when executed by the at least one processor, cause the at least one processor to execute a method for preparing an aperture according to;

wherein the aperture comprises a housing, a rotor disposed in the housing, and a plurality of blades annularly distributed on the rotor, wherein a guide post is disposed on the rotor, and the method comprises:

acquiring an aperture stop of the aperture, a rotor motion parameter of the aperture, a guide post position of the aperture, and a blade parameter of the aperture;

determining a guide groove path based on at least one of the aperture stop, the rotor motion parameter, the guide post position, or the blade parameter;

acquiring a preset tilt angle specification; and in a case where a path inclination angle between the guide groove path and the guide post position does not meet the preset tilt angle specification, segmenting the guide groove path to establish at least two sub-arc segments, and applying a G3 continuity design between two adjacent sub-arc segments of the at least two sub-arc segments.

* * * * *